United States Patent
Wang et al.

(10) Patent No.: US 11,915,484 B2
(45) Date of Patent: Feb. 27, 2024

(54) METHOD AND APPARATUS FOR GENERATING TARGET RE-RECOGNITION MODEL AND RE-RECOGNIZING TARGET

(71) Applicant: BEIJING BAIDU NETCOM SCIENCE AND TECHNOLOGY CO., LTD., Beijing (CN)

(72) Inventors: Zhigang Wang, Beijing (CN); Jian Wang, Beijing (CN); Errui Ding, Beijing (CN); Hao Sun, Beijing (CN)

(73) Assignee: Beijing Baidu Netcom Science and Technology Co., Ltd., Beiing (CN)

( * ) Notice: Subject to any disclaimer, the term of this patent is extended or adjusted under 35 U.S.C. 154(b) by 317 days.

(21) Appl. No.: 17/304,296

(22) Filed: Jun. 17, 2021

(65) Prior Publication Data

US 2021/0312208 A1    Oct. 7, 2021

(30) Foreign Application Priority Data

Oct. 23, 2020  (CN) .......................... 202011143731.3

(51) Int. Cl.
  *G06K 9/46*   (2006.01)
  *G06K 9/62*   (2022.01)
  (Continued)

(52) U.S. Cl.
  CPC ............ *G06V 20/52* (2022.01); *G06F 18/214* (2023.01); *G06F 18/2178* (2023.01);
  (Continued)

(58) Field of Classification Search
  CPC ...... G06V 20/52; G06V 10/762; G06V 10/82; G06V 10/764; G06V 10/7753;
  (Continued)

(56) References Cited

U.S. PATENT DOCUMENTS

| | | | |
|---|---|---|---|
| 11,556,746 B1* | 1/2023 | Dasgupta | .......... G06F 18/23213 |
| 2020/0125897 A1 | 4/2020 | Wang et al. | |
| 2022/0129705 A1* | 4/2022 | Kim | ..................... G06V 10/454 |

FOREIGN PATENT DOCUMENTS

CN    111695531 A    9/2020

OTHER PUBLICATIONS

Iscen et al., "Label Propagation for Deep Semi-supervised Learning", 2019 IEEE/CVF Conference on Computer Vision and Pattern Recognition (CVPR), Jun. 2019, pp. 5065-5074.

(Continued)

*Primary Examiner* — David F Dunphy
(74) *Attorney, Agent, or Firm* — Knobbe, Martens, Olson & Bear, LLP

(57) ABSTRACT

A method, an apparatus, device and a storage medium for generating a target re-recognition model are provided. The method may include: acquiring a set of labeled samples, a set of unlabeled samples and an initialization model obtained through supervised training; performing feature extraction on each sample in the set of the unlabeled samples by using the initialization model; clustering features extracted from the set of the unlabeled samples by using a clustering algorithm; assigning, for each sample in the set of the unlabeled samples, a pseudo label to the sample according to a cluster corresponding to the sample in a feature space; and mixing a set of samples with a pseudo label and the set of the labeled samples as a set of training samples, and performing supervised training on the initialization model to obtain a target re-recognition model.

15 Claims, 7 Drawing Sheets

(51) Int. Cl.
*G06V 20/52* (2022.01)
*G06F 18/23* (2023.01)
*G06F 18/214* (2023.01)
*G06F 18/21* (2023.01)
*G06V 10/762* (2022.01)
*G06V 10/764* (2022.01)
*G06V 10/774* (2022.01)
*G06V 10/82* (2022.01)
*G06V 20/64* (2022.01)
*G06V 40/10* (2022.01)

(52) U.S. Cl.
CPC ............ *G06F 18/23* (2023.01); *G06V 10/762* (2022.01); *G06V 10/764* (2022.01); *G06V 10/7753* (2022.01); *G06V 10/82* (2022.01); *G06V 20/64* (2022.01); *G06V 40/10* (2022.01); *G06V 2201/07* (2022.01)

(58) Field of Classification Search
CPC .... G06V 20/64; G06V 40/10; G06V 2201/07; G06F 18/2178; G06F 18/214; G06F 18/23
See application file for complete search history.

(56) References Cited

OTHER PUBLICATIONS

Jepsen, "How to do Deep Learning on Graphs with Graph Convolutional Networks", dated Sep. 18, 2018 in 12 pages, retrieved from <https://towardsdatascience.com/how-to-do-deep-learning-on-graphs-with-graph-convolutional-networks-7d2250723780>.
Extended European Search Report of Patent Application No. 21179362. 5, dated Dec. 8, 2021 in 9 pages.

* cited by examiner

METHOD AND APPARATUS FOR GENERATING TARGET RE-RECOGNITION MODEL AND RE-RECOGNIZING TARGET

CROSS-REFERENCE TO RELATED APPLICATIONS

This application claims the priority of Chinese Patent Application No. 202011143731.3, titled "METHOD AND APPARATUS FOR GENERATING TARGET RE-RECOGNITION MODEL AND RE-RECOGNIZING TARGET", filed on Oct. 23, 2020, the content of which is incorporated herein by reference in its entirety.

TECHNICAL FIELD

The present disclosure relates to the technical field of artificial intelligence, and specifically, to the technical fields of computer vision and deep learning.

BACKGROUND

Artificial intelligence is a discipline of making computers simulate certain human thinking processes and intelligent behaviors (such as learning, reasoning, thinking and planning), including both hardware-level technologies and software-level technologies. Artificial intelligence hardware technologies generally include technologies, such as sensors, dedicated artificial intelligence chips, cloud computing, distributed storage and big data processing. Artificial intelligence software technologies mainly include technologies, such as computer vision technologies, speech recognition technologies, natural language processing technologies, machine learning or deep learning, big data processing technologies and knowledge graph technologies.

Target re-recognition, also called re-identification, is mainly applied to the fields of pedestrian re-recognition and vehicle re-recognition. In particular, there are many researches and disclosed sets of data for pedestrian re-recognition. Target re-recognition is mainly used for the cross-camera tracking of targets, and realizing scenario matching may realize the cross-field tracking of suspected pedestrians or vehicles and trajectory prediction, and the like. In practical industrial applications, it is difficult to obtain labels of re-recognition tasks of targets, such as large-scale pedestrians or vehicles. In this case, the use of unsupervised learning becomes an effective prerequisite for the use of re-recognition technologies. Existing unsupervised re-recognition technologies are generally based on re-recognition models trained based on disclosed sets of data, but in these processes, the set of labeled data is only used to learn one pre-trained model, and then only unlabeled data is used for training.

SUMMARY

Some embodiments of the present disclosure provide a method, apparatus, device and storage medium for generating a target re-recognition model, and a method, apparatus, device and storage medium for re-recognizing a target.

According to a first aspect of the present disclosure, the method for generating a target re-recognition model is provided, and the method includes: acquiring a set of labeled samples, a set of unlabeled samples and an initialization model obtained through supervised training; performing feature extraction on each sample in the set of the unlabeled samples by using the initialization model; clustering features extracted from the set of the unlabeled samples by using a clustering algorithm; assigning, for each sample in the set of the unlabeled samples, a pseudo label to each sample according to a cluster corresponding to each sample in a feature space; and mixing a set of samples with a pseudo label and the set of the labeled samples as a set of training samples, and performing the supervised training on the initialization model to obtain a target re-recognition model.

According to a second aspect of the present disclosure, the method for re-recognizing a target is provided, and the method includes: acquiring a to-be-recognized monitoring image; and inputting the monitoring image into the target re-recognition model trained by the method according to any one of the implementations of the first aspect to generate a target re-recognition result.

According to a third aspect of the present disclosure, the apparatus for generating a target re-recognition model is provided, and the apparatus includes: an acquisition unit configured to acquire a set of labeled samples, a set of unlabeled samples and an initialization model obtained through supervised training; a feature extraction unit configured to perform feature extraction on each sample in the set of the unlabeled samples by using the initialization model; a clustering unit configured to cluster features extracted from the set of the unlabeled samples by using a clustering algorithm; an assignment unit configured to assign, for each sample in the set of the unlabeled samples, a pseudo label to each sample according to a cluster corresponding to each sample in a feature space; and a training unit configured to mix a set of samples with a pseudo label and the set of the labeled samples as a set of training samples, and perform the supervised training on the initialization model to obtain a target re-recognition model.

According to a fourth aspect of the present disclosure, the apparatus for re-recognizing a target is provided, and the apparatus includes: an image acquisition unit configured to acquire a to-be-recognized monitoring image; and an image recognition unit configured to input the monitoring image into the target re-recognition model trained by the method according to any one of the implementations of the first aspect to generate a target re-recognition result.

According to a fifth aspect of the present disclosure, the electronic device is provided, including: at least one processor; and a memory communicatively connected to the at least one processor, where the memory stores instructions executable by the at least one processor, and the instructions, when executed by the at least one processor, cause the at least one processor to perform the method according to any one of the implementations of the first aspect.

According to a sixth aspect of the present disclosure, the non-transitory computer readable storage medium storing computer instructions is provided, and the computer instructions cause a computer to perform the method according to any one of the implementations of the first aspect.

According to the technologies of the present disclosure, multi-source unsupervised domain-fusion target re-recognition methods are provided. Multi-source represents that sets of labeled data from different sources and unlabeled data of target application scenarios are used in model training, unsupervised represents that the data in the target application scenarios is not labeled, and domain-fusion represents that features of the labeled data and the features of the unlabeled data are fused to help the target application scenarios to perform model training.

It should be appreciated that the content described in this section is not intended to identify the key or critical features of embodiments of the present disclosure, nor is it intended to limit the scope of the present disclosure. The other features of the present disclosure will become easy to understand through the following description.

BRIEF DESCRIPTION OF THE DRAWINGS

The accompanying drawings are intended to provide a better understanding of the present disclosure and do not constitute a limitation to the present disclosure.

DETAILED DESCRIPTION OF EMBODIMENTS

Example embodiments of the present disclosure are described below in combination with the accompanying drawings, where various details of the embodiments of the present disclosure are included to facilitate understanding and should be considered as examples only. Therefore, those of ordinary skill in the art should realize that various changes and modifications may be made to the embodiments described herein without departing from the scope and spirit of the present disclosure. Similarly, for clarity and conciseness, descriptions of well-know functions and structures are omitted in the following description.

Figure 1:
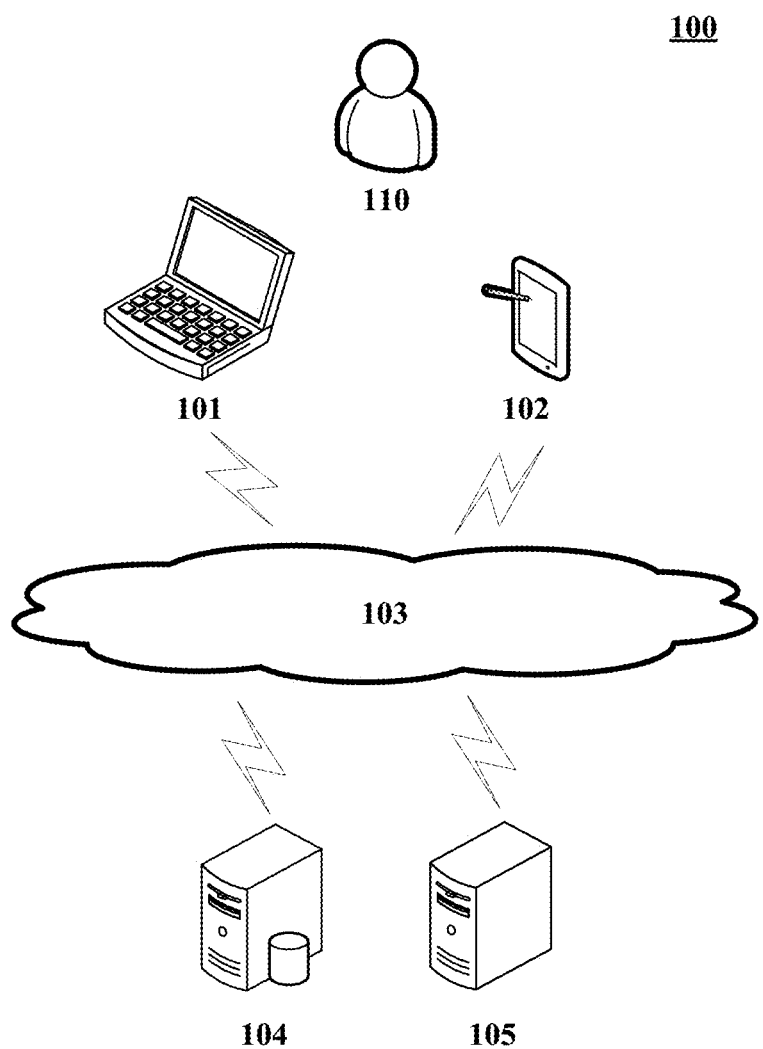
FIG. 1 is an example system architecture to which an embodiment of the present disclosure may be applied.

FIG. 1 shows an example system architecture 100 to which an embodiment of a method for generating a target re-recognition model, an embodiment of a method for re-recognizing a target, an embodiment of an apparatus for generating a target re-recognition model and an embodiment of an apparatus for re-recognizing a target according to the present disclosure may be applied.

As shown in FIG. 1, the system architecture 100 may include terminal devices 101, 102 a network 103, a database server 104 and a server 105. The network 103 serves as a medium for providing a communication link among the terminal devices 101, 102, the database server 104 and the server 105. The network 103 may include various types of connections, such as wired or wireless communication links, or optical fiber cables.

A user 110 may use the terminal devices 101, 102 to interact with the server 105 through the network 103 to receive or send messages. Various client applications, such as model training applications, target detection and recognition applications, shopping applications, payment applications, web browsers and instant messaging tools, may be installed on the terminal devices 101, 102.

The terminal devices 101, 102 may be hardware or software. When the terminal devices 101, 102 are hardware, the terminal devices 101, 102 may be various electronic devices having a display screen, including but not limited to, a smart phone, a tablet computer, an electronic book reader, an MP3 player (Moving Picture Experts Group Audio Layer III), a laptop portable computer and a desktop computer; and when the terminal devices 101, 102 are software, the terminal devices 101, 102 may be installed in the electronic devices, and may be implemented as multiple software pieces or software modules (such as for providing distributed services), or as a single software piece or software module, which is not specifically limited herein.

When the terminal devices 101, 102 are hardware, an image acquisition device may be installed on the terminal devices 101, 102. The image acquisition device may be various devices capable of acquiring an image, such as a camera and a sensor. The user 110 may acquire an image of a target object of himself or other person by using the image acquisition device on the terminal devices 101, 102.

The database server 104 may be a database server providing various services. For example, a set of samples may be stored in the database server. The set of samples contains a large number of samples. A sample may include a sample image and sample label corresponding to the sample image, and a sample may be an object such as a pedestrian or a vehicle. In this case, the user 110 may alternatively select a sample from a set of samples stored in the database server 104 through the terminal devices 101, 102.

The server 105 may be a server providing various services, such as a background server providing support for various applications displayed on the terminal devices 101, 102. The background server may train an initial model by using the samples in a set of samples sent by the terminal devices 101, 102, and may send a training result (such as a generated re-recognition model) to the terminal devices 101, 102. In this way, the user may apply the generated re-recognition model to target re-recognition.

The database server 104 and server 105 herein may be hardware or software. When the database server 104 and server 105 are hardware, the database server 104 and server 105 may be implemented as a distributed server cluster composed of multiple servers, or as a single server; and when the database server 104 and server 105 are software, the database server 104 and server 105 may be implemented as multiple software pieces or software modules (such as for providing distributed services), or as a single software piece or software module, which is not specifically limited herein.

It should be noted that the method for generating a target re-recognition model or the method for re-recognizing a target provided by some embodiments of the present disclosure is generally executed by the server 105. Correspondingly, the apparatus for generating a target re-recognition model or the apparatus for re-recognizing a target is also generally arranged in the server 105.

It should be noted that in the case where the server 105 may implement the relevant functions of the database server 104, the system architecture 100 may alternatively not include the database server 104.

It should be appreciated that the number of the terminal devices, the network, the database server and the server in FIG. 1 is merely illustrative. Any number of terminal devices, networks, database servers and servers may be provided according to actual requirements.

Figure 2:
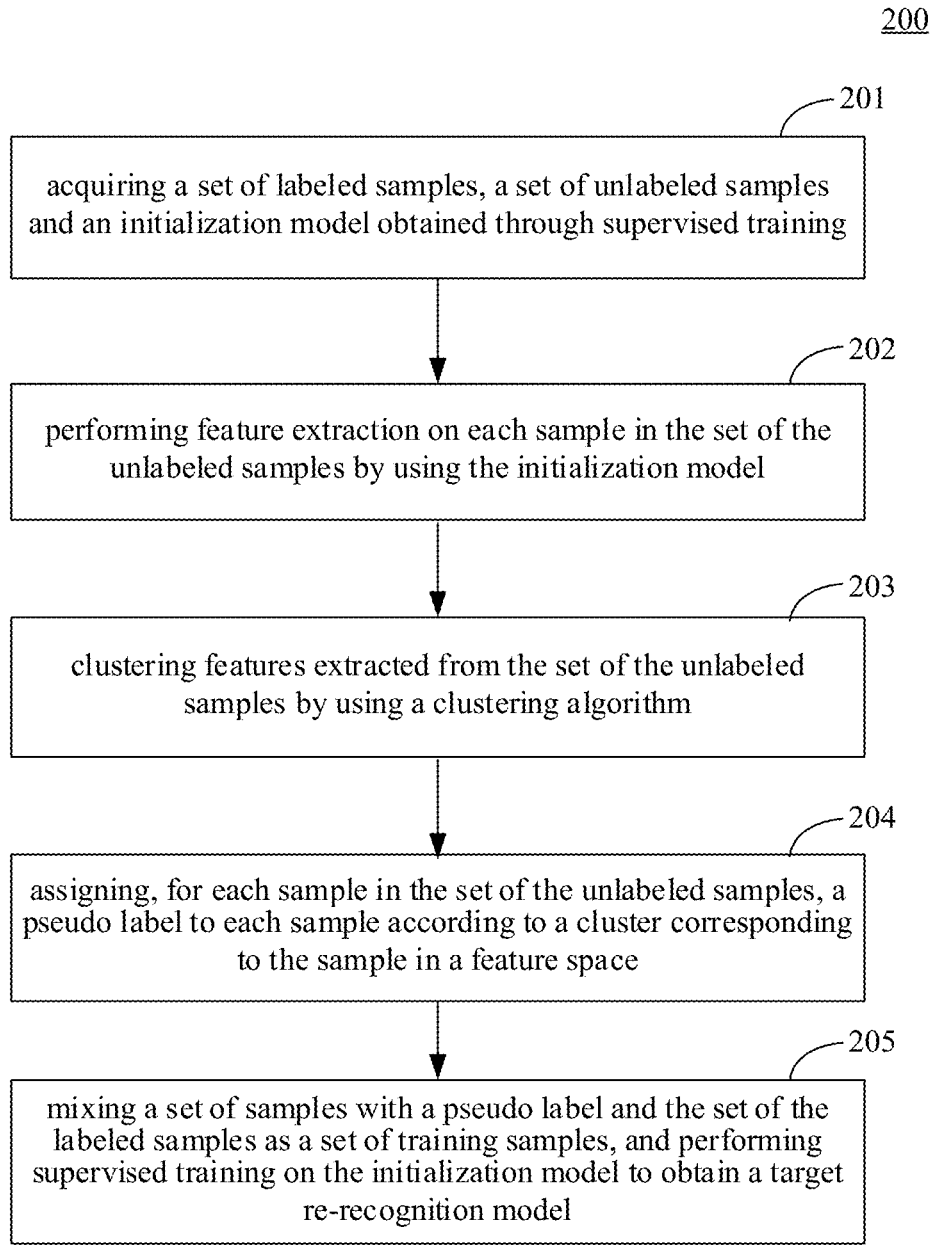
FIG. 2 is a flowchart of an embodiment of a method for generating a target re-recognition model according to the present disclosure.

Further referring to FIG. 2, a flow 200 of an embodiment of a method for generating a target re-recognition model according to the present disclosure is shown. The method for generating a target re-recognition model includes steps 201 to 205.

Step 201 includes acquiring a set of labeled samples, a set of unlabeled samples and an initialization model obtained through supervised training.

In some embodiments, an execution body of the method for generating a target re-recognition model (such as the database server 104 shown in FIG. 1) may acquire the set of the labeled samples, the set of the unlabeled samples and the initialization model obtained through the supervised training in multiple ways. For example, the execution body may acquire an existing set of samples stored in a database server from the database server (such as the database server 104 shown in FIG. 1) through a wired connection or a wireless connection. For another example, a user may receive samples collected by a terminal (such as the terminal devices 101, 102 shown in FIG. 1). In this case, the execution body may receive the samples collected by the terminal and store the samples locally, thereby generating a set of the samples.

Sets of samples are divided into two classes, one class is a set of labeled samples, and the other class is a set of unlabeled samples. The set of the labeled samples and the set of the unlabeled samples are from different scenarios, and images in the different scenarios may have different image styles (illumination, contrast and the like), which results in a fact that the direct mixing of the labeled and unlabeled data does not improve the performance of a trained model, and even causes a decrease in accuracy. Each class of the set of samples may include at least one sample. A labeled sample may include a sample image and a label corresponding to the sample image. For example, a given pedestrian in different images has a uniform number. An unlabeled sample includes only a sample image without a corresponding label. Generally, the labeled sample is manually labeled, and is adapted to certain specific scenarios, such as a school and a mall. The unlabeled sample may be in other application scenario, such as a railway station and a hospital.

The initialization model obtained through the supervised training refers to a target re-recognition model obtained by supervised pre-training using the set of the labeled samples. The pre-training process may be performed by the execution body of the method for generating a target re-recognition model, or may be performed by a third-party server. The set of the labeled samples used in the pre-training process may be the samples used in steps 201 to 205, or may be other samples. For example, the pre-training process of the initialization model uses a set of labeled samples from a school. However, the training process of the target re-recognition model of some embodiments of the present disclosure may not only use a set of labeled samples from a school, but also use a set of labeled samples from data sources, such as a shopping mall or an amusement park.

The initialization model may generally include a feature extraction layer and a classification layer. The feature extraction layer may include a convolutional layer, a pooling layer, a fully connected layer and the like, which are all existing technologies, and thus are not described in detail herein.

Step 202 includes performing feature extraction on each sample in the set of the unlabeled samples by using the initialization model.

In some embodiments, when the feature extraction is performed on each sample in the set of the unlabeled samples by using the initialization model, a result only needs to be output from the feature extraction layer, without being input to the classification layer.

Step 203 includes clustering features extracted from the set of the unlabeled samples by using a clustering algorithm.

In some embodiments, the features of the unlabeled samples extracted in step 202 may be clustered by using a clustering algorithm such as k-means and DBSCAN. In this case, the set of the unlabeled samples is divided into many different clusters in a feature space. The set of the labeled samples does not participate in the feature clustering step.

Step 204 includes assigning, for each sample in the set of the unlabeled samples, a pseudo label to each sample according to a cluster corresponding to the sample in a feature space.

In some embodiments, the number of clusters is regarded as the target number of a currently unlabeled sample, and a cluster index is regarded as a pseudo label of each sample. For example, if a sample is a pedestrian photo, the number of clusters is the number of pedestrians, and the cluster index is regarded as a pseudo label of each pedestrian.

Step 205 includes mixing a set of samples with a pseudo label and the set of the labeled samples as a set of training samples, and performing supervised training on the initialization model to obtain a target re-recognition model.

In some embodiments, the set of the samples with the pseudo label and the set of the labeled samples are mixed as the set of the training samples, and the mixing method may be random mixing or mixing according to a predetermined proportion. For example, the unlabeled samples are 40% of samples in each batch, and if the number of labeled samples does not reach 60%, the samples may be enhanced by rotating, clipping, scaling or the like. The proportions of the samples with a pseudo label and the labeled samples may be dynamically adjusted according to the change of a loss value during training. For example, if the loss value is difficult to be decreased when the training is performed using samples in which unlabeled samples account for 40%, the proportion of the unlabeled samples is then reduced.

The process of performing supervised training on an initialization model is an existing technology, and is not described in detail herein.

According to the method provided by some embodiments of the present disclosure, the target re-recognition model is trained by mixing the set of the samples with the pseudo label and the set of the labeled samples. The labeled samples are fully used to accelerate the training speed of the target re-recognition model and improve the performance of the model.

Figure 3:
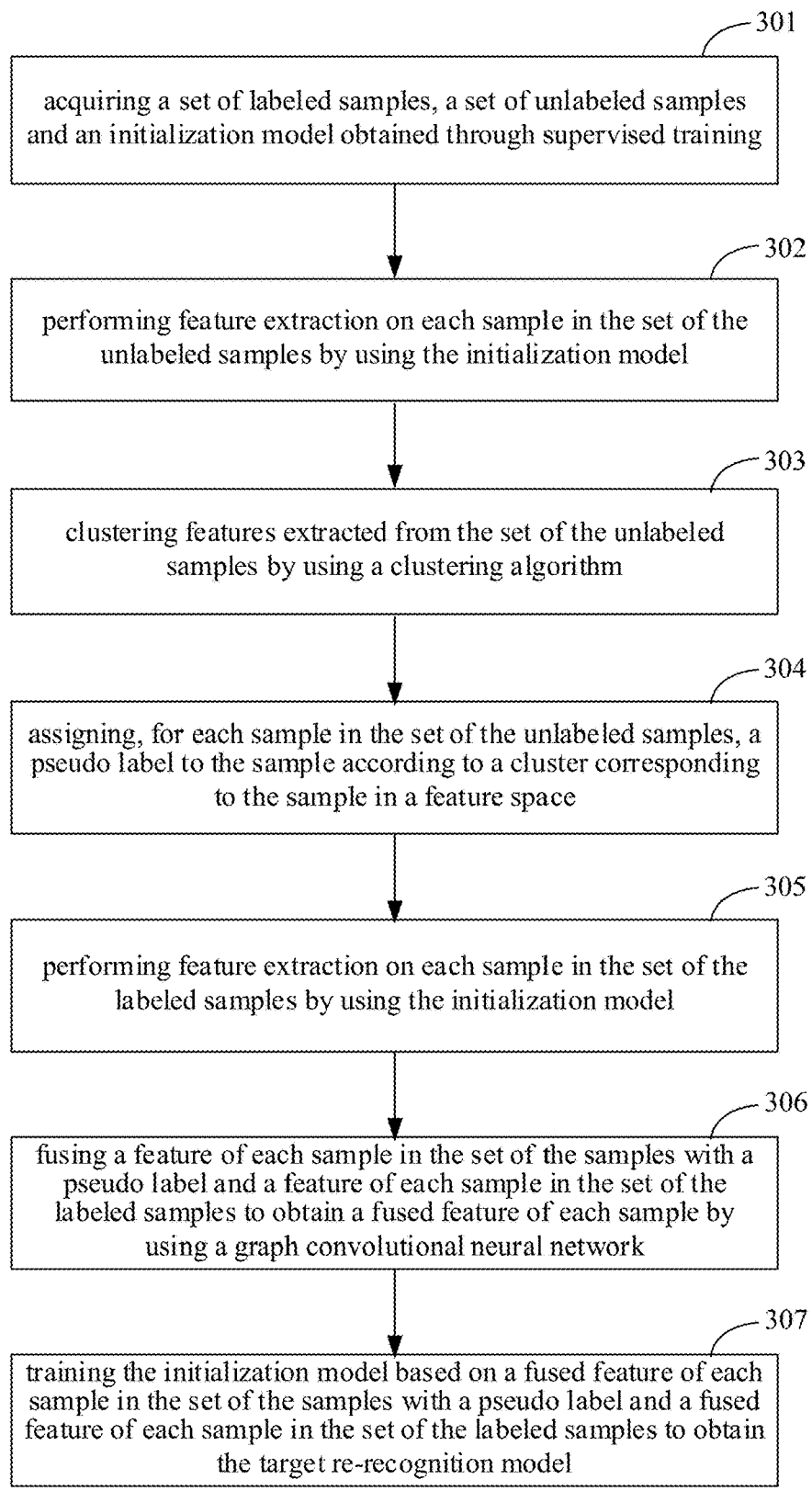
FIG. 3 is a flowchart of another embodiment of the method for generating a target re-recognition model according to the present disclosure.

Further referring to FIG. 3, a flow 300 of another embodiment of the method for generating a target re-recognition model is shown. The flow 300 of the method for generating a target re-recognition model includes steps 301 to 307.

Step 301 includes acquiring a set of labeled samples, a set of unlabeled samples and an initialization model obtained through supervised training.

Step 302 includes performing feature extraction on each sample in the set of the unlabeled samples by using the initialization model.

Step 303 includes clustering features extracted from the set of the unlabeled samples by using a clustering algorithm.

Step 304 includes assigning, for each sample in the set of the unlabeled samples, a pseudo label to the sample according to a cluster corresponding to the sample in a feature space.

Steps 301 to 304 are substantially the same as steps 201 to 204, and are thus not described in detail herein.

Step 305 includes performing feature extraction on each sample in the set of the labeled samples by using the initialization model.

In some embodiments, when the feature extraction is performed on each sample in the set of the labeled samples by using the initialization model, a result only needs to be output from the feature extraction layer without being input to the classification layer. Labeled samples may be from different data sources, and each feature extracted from the labeled samples is labeled with a data source. Features extracted from the unlabeled samples in step 302 are uniformly labeled as being derived from a target application scenario.

In some alternative implementations of the present disclosure, the present disclosure uses at least one set of labeled samples, and each set of labeled samples is from one data source. The more data sources involved in the training are, the more the specific style of each source may be weakened, which prevents the over-fitting of a neural network model, thereby improving the accuracy the model obtained by training.

Step 306 includes fusing a feature of each sample in the set of the samples with a pseudo label and a feature of each sample in the set of the labeled samples to obtain a fused feature of each sample by using a graph convolutional neural network.

In some embodiments, the graph convolutional neural network is a method for performing deep learning on map data. Some embodiments of the present disclosure proposes to fuse image features of different domains (which may be simply understood as different sets of samples) by using the graph convolutional neural network, and then to perform re-recognition model training on the fused features generally by using a classified cross entropy loss function.

Figure 4A:
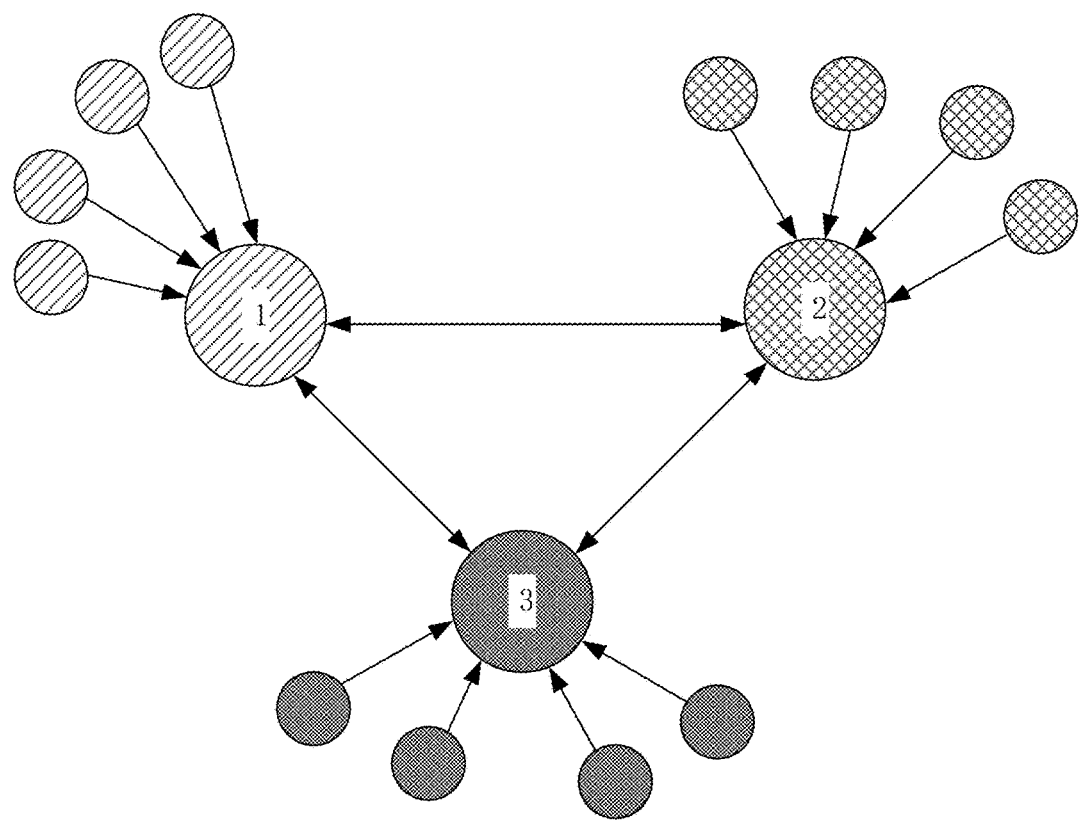
FIGS. 4a and 4b are structural diagrams of a graph convolutional neural network of the method for generating a target re-recognition model according to some embodiments of the present disclosure.
Figure 4B:
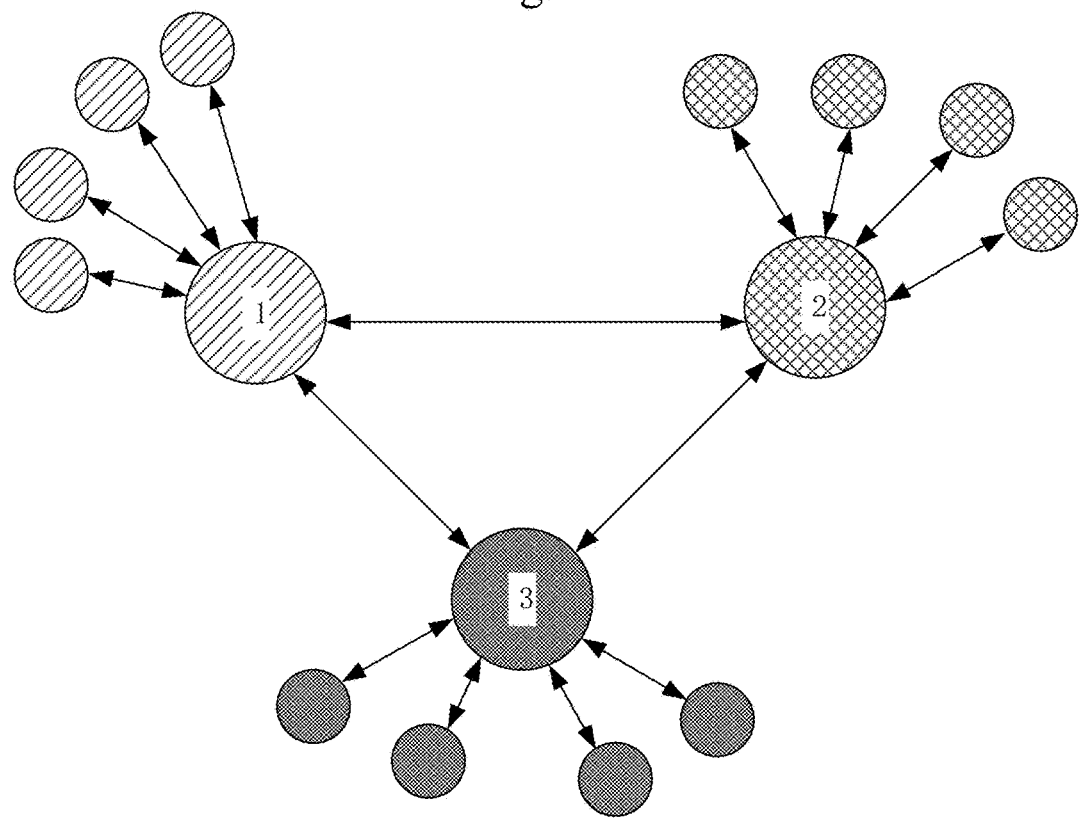

In some alternative implementations of the present disclosure, the graph convolutional neural network includes a first graph convolutional layer and a second graph convolutional layer. The first graph convolutional layer (as shown in FIG. 4*a*) includes at least one sample node representing a sample and at least one proxy node representing a set of samples, and sample nodes belonging to a given set of samples are unidirectionally connected to a given proxy node, and proxy nodes are interconnected, and each proxy node performs a weighted sum on sample features of sample nodes connected to the proxy node to obtain a proxy feature of the proxy node, and proxy features of all proxy nodes are fused through the first graph convolutional layer to obtain output features of the proxy nodes of the first graph convolutional layer; and the second graph convolutional layer (as shown in FIG. 4*b*) includes at least one sample node representing a sample and at least one proxy node representing a set of samples, and sample nodes belonging to a given set of samples are bidirectionally connected to a given proxy node, and proxy nodes are interconnected, and the output features of the proxy nodes of the first graph convolutional layer are fused through the second graph convolutional layer to obtain an output feature of each sample node. This fusion method allows the features of each set of samples to be fused with the features of other sets of samples, thereby reducing the dependence of the model on a certain source and obtaining the model with high accuracy.

The schematic structural diagrams of the graph convolutional neural network are shown as FIGS. 4*a* and 4*b*. Referring first to FIG. 4*a*, different filling patterns represent different domains (data sources), a small circle represents a sample feature, and a large circle is a proxy feature of a specific domain, which is obtained by performing a weighted sum on the sample features of the domain, where the weight is obtained by automatic training of learnable parameters in the neural network. Then, proxy features are fused through the graph convolutional neural network. Specifically, the adjacency matrix of several proxy nodes in the graph convolutional neural network is an all-in-one matrix, indicating that the output feature of proxy nodes in the current layer of the graph convolutional neural network is the weighted sum of all proxy features. FIG. 4B shows a second layer of the graph convolutional neural network, as shown in FIG. 2, the proxy nodes are still in a pairwise adjacency relationship, indicating that proxy features of different domains are still fused with each other. However, the difference is that there is also an adjacency relationship between each sample node and the proxy node of the sample node in each domain, indicating that in the second layer of the graph convolutional neural network, the proxy feature is obtained by weighting the samples in the domain of the proxy node, and the output feature of each sample in the second layer is the weighted sum of its own feature and the proxy feature. In this case, each sample of each domain incorporates the feature information of other domains, thereby reducing the feature specificity of its own domain.

In some alternative implementations of this embodiment, the graph convolutional neural network includes a first graph convolutional layer and at least one second graph convolutional layer, where an output of the first graph convolutional layer is used as an input of a second graph convolutional layer, and an output feature of each second graph convolutional layer is used as an input of a next second graph convolutional layer or an input of a classification layer of the initialization model. The accuracy of the model may be further improved through the iteration of the multi-layer network.

Step 307 includes training the initialization model based on a fused feature of each sample in the set of the samples with a pseudo label and a fused feature of each sample in the set of the labeled samples to obtain the target re-recognition model.

In some embodiments, the graph convolutional neural network is located between the feature extraction layer and the classification layer. the features of the labeled samples and the features of the samples with a pseudo label extracted in the feature extraction layer are input into the graph convolutional neural network, and the graph convolutional neutral network inputs the fused features into the classification layer to obtain a prediction result. A loss value is calculated by comparing the prediction result with the labels or pseudo labels of the input samples. According to the loss value, the network parameters of the feature extraction layer, the classification layer, and the graph convolutional neural network are adjusted, and then some unlabeled samples and labeled samples are selected to repeat steps 301 to 307 until a loss value is smaller than a predetermined threshold value or the number of iterations reaches a predetermined value, indicating that the training of the target re-recognition model is completed. The finally obtained target re-recognition model may include only the feature extraction layer and the classification layer, and may alternatively include the graph convolutional neural network.

Such an operation may weaken the specific style of each domain, reduce the risk of the neural network model over-fitting a certain domain, and make the trained model more robust.

Figure 5:
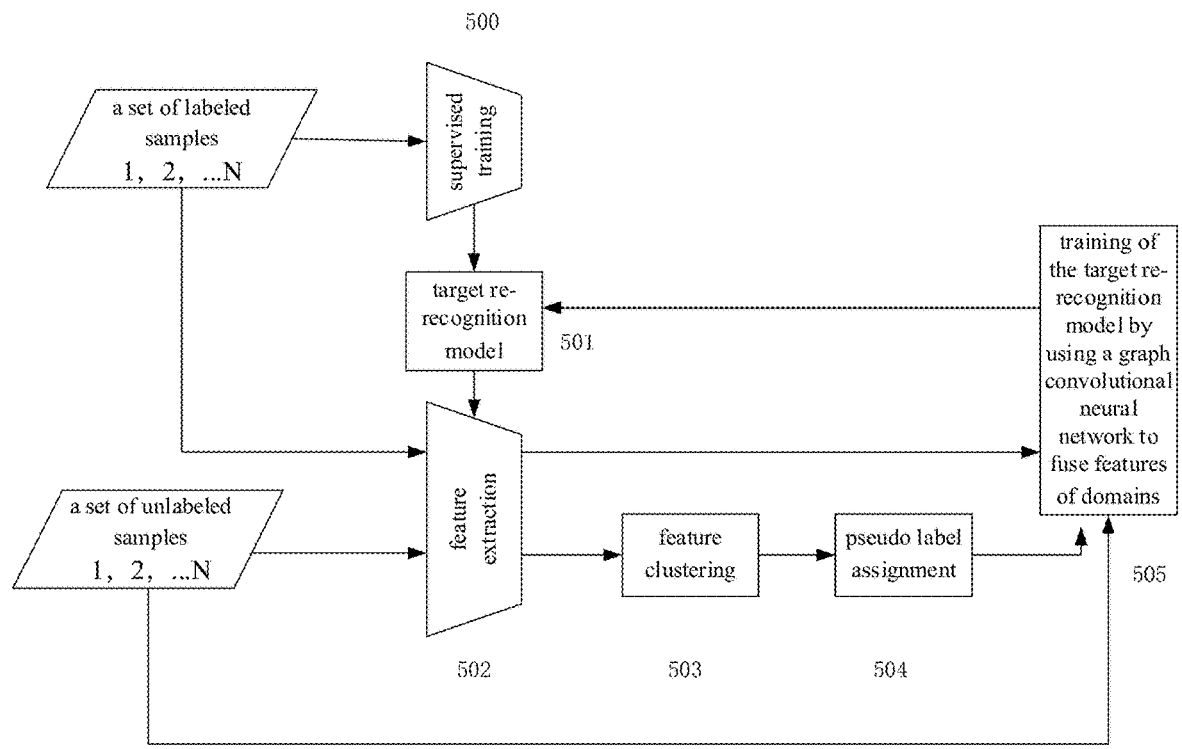
FIG. 5 is a schematic diagram of an application scenario of the method for generating a target re-recognition model according to some embodiments of the present disclosure.

Further referring to FIG. 5, FIG. 5 is a schematic diagram of an application scenario of the method for generating a target re-recognition model according to some embodiments. In the application scenario of FIG. 5, the following flow is shown.

Supervised training 500: an initialization model with a certain label distinguishing capability is first trained according to a general target re-recognition supervised training flow by using a set of labeled samples.

Training an obtained target re-recognition model 501: since the entire training process is performed iteratively, the model herein may be the initialization model obtained by the above step 500, or may be a model obtained by subsequent re-training.

Feature extraction step 502: the feature extraction is performed on each sample image in a set of unlabeled samples by using the target re-recognition model in 501. Both labeled and unlabeled samples participate in this process, and each sample image is labeled with a source from which the sample image is, i.e., a set of data from which the sample image is.

Feature clustering 503: the features of the unlabeled samples extracted in step 502 may be clustered by using a clustering algorithm such as k-means and DBSCAN (any one is available). In this case, the set of the unlabeled samples is divided into many different clusters in a feature space. The set of the labeled samples does not participate in the feature clustering step.

Pseudo label assignment 504: a pseudo label is assigned to each sample image according to a cluster corresponding to each sample image in the set of unlabeled samples in the feature space. The pseudo label is the corresponding cluster index.

Training of the target re-recognition model by using a graph convolutional neural network to fuse features of domains 505: both the labeled and unlabeled samples participate in this process. The set of the labeled samples and the set of the unlabeled samples are from different scenarios, and images in the different scenarios may have different image styles (illumination, contrast and the like), which results in a fact that the direct mixing of the labeled and unlabeled samples does not improve the performance of the trained model, and even causes a decrease in accuracy. In order to solve this problem, some embodiments of the present disclosure propose to fuse image features of different domains (which may be simply understood as different sets of samples) by using the graph convolutional neural network, and then to perform re-recognition model training on the fused features generally by using a classified cross entropy loss function. Such an operation may weaken the specific style of each domain, reduce the risk of the neural network model overfitting a certain domain, and make the trained model more robust. The schematic structural diagrams of the graph convolutional neural network of this application scenario are shown as FIGS. 4a and 4b. Through this method, each sample in each domain incorporates the feature information of other domains, thereby reducing the feature specificity of its own domain.

Figure 6:
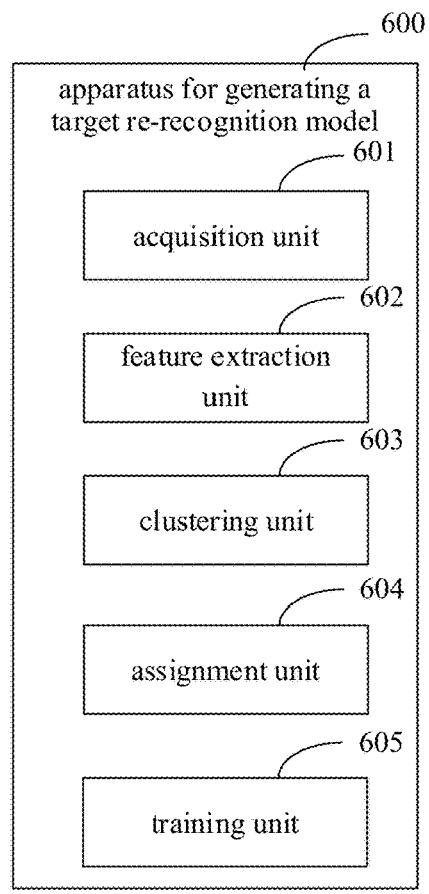
FIG. 6 is a schematic structural diagram of an embodiment of an apparatus for generating a target re-recognition model according to the present disclosure.

Further referring to FIG. 6, as an implementation of the method shown in each of the above figures, the present disclosure provides an embodiment of an apparatus for generating a target re-recognition model. The embodiment of the apparatus corresponds to the embodiment of the method shown in FIG. 2, and the apparatus is particularly applicable to various electronic devices.

As shown in FIG. 6, the apparatus 600 for generating a target re-recognition model of some embodiments may include: an acquisition unit 601, a feature extraction unit 602, a clustering unit 603, an assignment unit 604 and a training unit 605. The acquisition unit 601 is configured to acquire a set of labeled samples, a set of unlabeled samples and an initialization model obtained through supervised training; the feature extraction unit 602 is configured to perform feature extraction on each sample in the set of the unlabeled samples by using the initialization model; the clustering unit 603 is configured to cluster features extracted from the set of the unlabeled samples by using a clustering algorithm; the assignment unit 604 is configured to assign, for each sample in the set of the unlabeled samples, a pseudo label to the sample according to a cluster corresponding to the sample in a feature space; and the training unit 605 is configured to mix a set of samples with a pseudo label and the set of the labeled samples as a set of training samples, and perform supervised training on the initialization model to obtain a target re-recognition model.

In some embodiments, the specific processing of the acquisition unit 601, the feature extraction unit 602, the clustering unit 603, the assignment unit 604 and the training unit 605 of the apparatus 600 for generating a target re-recognition model may be described with reference to steps 201 to 205 in the embodiment corresponding to FIG. 2.

In some alternative implementations of this embodiment, the training unit 605 is further configured to: perform feature extraction on each sample in the set of the labeled samples by using the initialization model; fuse, by using a graph convolutional neural network, a feature of each sample in the set of the samples with a pseudo label and a feature of each sample in the set of the labeled samples to obtain a fused feature of each sample; and train the initialization model based on the fused feature of each sample in the set of the samples with a pseudo label and the fused feature of each sample in the set of the labeled samples to obtain the target re-recognition model.

In some alternative implementations of this embodiment, the graph convolutional neural network includes a first graph convolutional layer and a second graph convolutional layer. The first graph convolutional layer includes at least one sample node representing a sample and at least one proxy node representing a set of samples, and sample nodes belonging to a given set of samples is unidirectionally connected to a given proxy node, and proxy nodes are interconnected, and each proxy node performs a weighted sum on sample features of sample nodes connected to the proxy node to obtain a proxy feature of the proxy node, and proxy features of all proxy nodes are fused through the first graph convolutional layer to obtain output features of the proxy nodes of the first graph convolutional layer; and the second graph convolutional layer includes at least one sample node representing a sample and at least one proxy node representing a set of samples, and sample nodes belonging to a given set of samples is bidirectionally connected to a given proxy node, and proxy nodes are interconnected, and the output features of the proxy nodes of the first graph convolutional layer are fused through the second graph convolutional layer to obtain an output feature of each sample node.

In some alternative implementations of this embodiment, the graph convolutional neural network includes the first graph convolutional layer and at least one second graph convolutional layer, where an output of the first graph convolutional layer is used as an input of a second graph convolutional layer, and an output feature of each second graph convolutional layer is used as an input of a next second graph convolutional layer or an input of a classification layer of the initialization model.

In some alternative implementations of this embodiment, the apparatus uses at least one set of labeled samples, and each set of labeled samples is from one data source.

Figure 7:
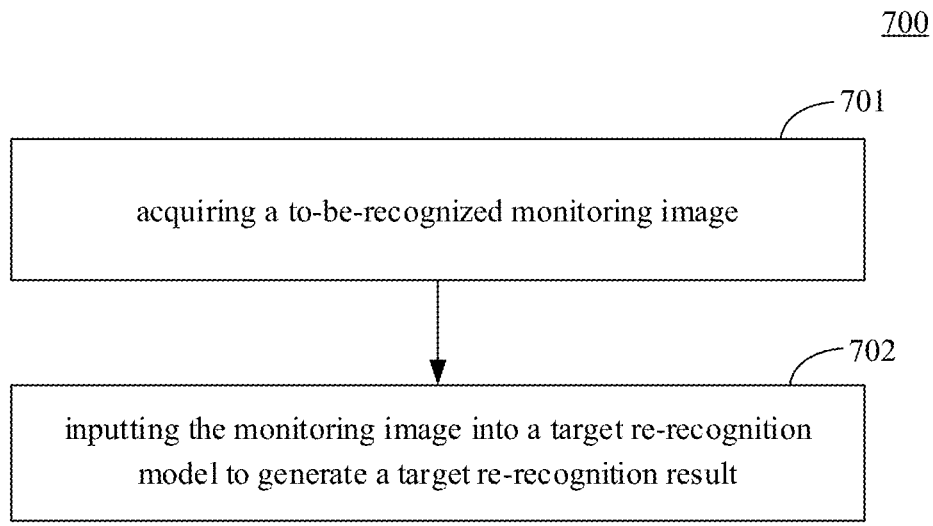
FIG. 7 is a flowchart of an embodiment of a method for re-recognizing a target according to the present disclosure.

Referring to FIG. 7, a flow 700 of an embodiment of a method for re-recognizing a target according to the present disclosure is shown. The method for re-recognizing a target may include step 701 to 702.

Step 701 includes acquiring a to-be-recognized monitoring image.

In some embodiments, an execution body of the method for re-recognizing a target (such as the server 105 shown in FIG. 1) may acquire the to-be-recognized monitoring image in multiple ways. For example, the execution body may acquire a monitoring image stored in a database server from the database server (such as the database server 104 shown in FIG. 1) through a wired connection or a wireless connection. For another example, the execution body may receive a monitoring image collected by a terminal (such as the terminal devices 101, 102 shown in FIG. 1) or other devices.

In some embodiments, a to-be-recognized object may be any person or vehicle. The monitoring image may be from a video or a photo, and may be a color image and/or a grayscale image. The format of the monitoring image is also not limited in the present disclosure.

Step 702 includes inputting the monitoring image into a target re-recognition model to generate a target re-recognition result.

In some embodiments, the execution body may input the monitoring image acquired in step 701 into the target re-recognition model to generate the target re-recognition result of the recognized object. The target re-recognition result may be information for describing a pedestrian or a vehicle in the image. For example, the target re-recognition result may include whether a target person appears in multiple images.

In some embodiments, the target re-recognition model may be generated by using the method as described in the embodiment of FIG. 2 or FIG. 3. A specific generation process may be described with reference to the relevant description of the embodiment of FIG. 2 or FIG. 3, and is not described in detail herein.

It should be noted that the method for re-recognizing a target may be used to test the target re-recognition model generated according to the above embodiments. According to the test results, the target re-recognition model may be continuously optimized. The method may alternatively be an actual application method of the target re-recognition model generated according to the above embodiments. The target re-recognition model generated according to the above embodiments is used to perform target re-recognition, thereby improving the performance of target re-recognition.

Figure 8:
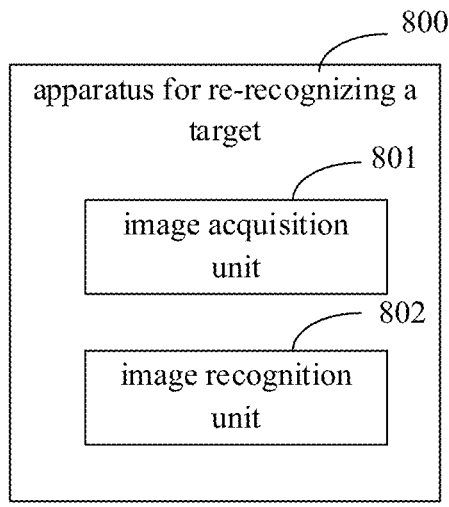
FIG. 8 is a schematic structural diagram of an embodiment of an apparatus for re-recognizing a target according to the present disclosure.

Further referring to FIG. 8, as an implementation of the method shown in FIG. 7, the present disclosure provides an embodiment of an apparatus for re-recognizing a target. The embodiment of the apparatus corresponds to the embodiment of the method shown in FIG. 7, and the apparatus is particularly applicable to various electronic devices.

As shown in FIG. 8, the apparatus 800 for re-recognizing a target of some embodiments may include: an image acquisition unit 801 configured to acquire a to-be-recognized monitoring image; and an image recognition unit 802 configured to input the monitoring image into the target re-recognition model generated by using the method as described in the embodiment of FIG. 2 or FIG. 3, to generate a target re-recognition result.

It should be appreciated that the units described in the apparatus 800 correspond to the steps in the method described with reference to FIG. 7. Therefore, the operations, features and beneficial effects described above are also applicable to the apparatus 800 and the units included in the apparatus 800, and thus are not described in detail herein.

According to an embodiment of the present disclosure, the present disclosure further provides an electronic device and a readable storage medium.

Figure 9:
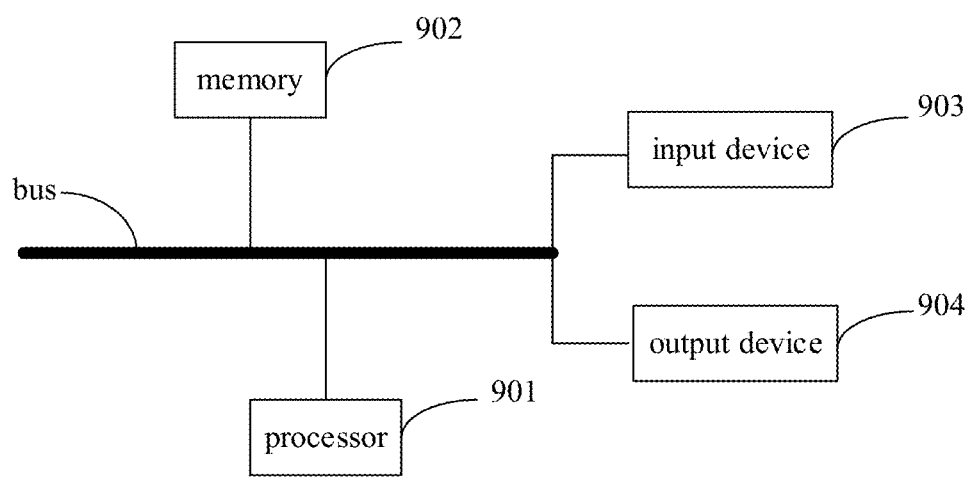
FIG. 9 is block diagram of an electronic device adapted to implement the method for generating a target re-recognition model or the method for re-recognizing a target according to an embodiment of the present disclosure.

FIG. 9 is a block diagram of an electronic device adapted to implement the method for generating a target re-recognition model or the method for re-recognizing a target according to an embodiment of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 9, the electronic device includes one or more processors 901, a memory 902 and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected (for example, used as a server array, a set of blade servers or a multiprocessor system), and the electronic device provides some of the necessary operations. An example of a processor 901 is shown in FIG. 9.

The memory 902 is a non-transitory computer readable storage medium according to some embodiments of the present disclosure. The memory stores instructions executable by at least one processor to cause the at least one processor to execute the method for generating a target re-recognition model or the method for re-recognizing a target according to some embodiments of the present disclosure. The non-transitory computer readable storage medium of some embodiments of the present disclosure stores computer instructions for causing a computer to execute the method for generating a target re-recognition model or the method for re-recognizing a target according to some embodiments of the present disclosure.

As a non-transitory computer readable storage medium, the memory 902 may be used to store non-transitory software programs, non-transitory computer executable programs and modules, such as the program instructions or modules (for example, the acquisition unit 601, the feature extraction unit 602, the clustering unit 603, the assignment unit 604 and the training unit 605 shown in FIG. 6) corresponding to the method for generating a target re-recognition model or the method for re-recognizing a target in the embodiment of the present disclosure. The processor 901 runs the non-transitory software programs, instructions and modules stored in the memory 902 to execute various functional applications and data processing of the server, thereby implementing the method for generating a target re-recognition model or the method for re-recognizing a target in the embodiment of the method.

The memory 902 may include a storage program area and a storage data area, where the storage program area may store an operating system and an application program required by at least one function; and the storage data area may store data created by the electronic device when executing the method for generating a target re-recognition model or the method for re-recognizing a target. In addition, the memory 902 may include a high-speed random access memory, and may further include a non-transitory memory, such as at least one magnetic disk storage device, a flash memory or other non-transitory solid state storage devices. In some embodiments, the memory 902 may alternatively include a memory disposed remotely relative to the processor 901, which may be connected through a network to the electronic device adapted to execute the method for generating a target re-recognition model or the method for re-recognizing a target. Examples of such networks include, but are not limited to, the Internet, enterprise intranets, local area networks, mobile communication networks and combinations thereof.

The electronic device adapted to execute the method for generating a target re-recognition model or the method for re-recognizing a target may further include an input device 903 and an output device 904. The processor 901, the memory 902, the input device 903 and the output device 904 may be interconnected through a bus or other means, and an example of a connection through a bus is shown in FIG. 9.

The input device 903 may receive input digit or character information, and generate key signal input related to user settings and functional control of the electronic device adapted to execute the method for generating a target re-recognition model or the method for re-recognizing a target, such as a touch screen, a keypad, a mouse, a track pad, a touch pad, a pointer bar, one or more mouse buttons, a trackball or a joystick. The output device 904 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), and the Internet.

The computer system may include a client and a server. The client and the server are typically remote from each other and typically interact through a communication network. The relationship between the client and the server is generated by a computer program running on the corresponding computer and having a client-server relationship with each other. The server may a server of a distributed system or a server combined with a blockchain. The server may alternatively be a cloud server, or a smart cloud computing server or a smart cloud host with artificial intelligence technology.

According to the technical solutions of some embodiments of the present disclosure, the labeled data and the unlabeled data are used together in the training process, and the features of different domains are fused by designing the graph convolutional neural network of multiple domains, and the style differences between different data sources may be alleviated to a certain extent, so that the mixed use of the multiple data sources becomes a feasible solution. Compared to a general method, the present disclosure may further improve the performance of the model and finally achieve better results.

It should be appreciated that the steps of reordering, adding or deleting may be executed using the various forms shown above. For example, the steps described in the present disclosure may be executed in parallel or sequentially or in a different order, so long as the expected results of the technical solutions provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for generating a target re-recognition model, the method comprising:
   acquiring a set of labeled samples, a set of unlabeled samples and an initialization model obtained through supervised training;
   performing feature extraction on each sample in the set of the unlabeled samples by using the initialization model;
   clustering features extracted from the set of the unlabeled samples by using a clustering algorithm;
   assigning, for each sample in the set of the unlabeled samples, a pseudo label to the each sample according to a cluster corresponding to the each sample in a feature space; and
   mixing a set of samples with a pseudo label and the set of the labeled samples as a set of training samples, and performing the supervised training on the initialization model to obtain a target re-recognition model, wherein mixing the set of samples with the pseudo label and the set of the labeled samples as the set of training samples, and performing the supervised training on the initialization model to obtain the target re-recognition model, comprises:
   performing feature extraction on each sample in the set of the labeled samples by using the initialization model;
   fusing, by using a graph convolutional neural network, a feature of each sample in the set of the samples with the pseudo label and a feature of each sample in the set of the labeled samples to obtain a fused feature of each sample; and
   training the initialization model based on the fused feature of each sample in the set of the samples with the pseudo label and the fused feature of each sample in the set of the labeled samples to obtain the target re-recognition model.

2. The method according to claim 1, wherein the graph convolutional neural network comprises a first graph convolutional layer and a second graph convolutional layer, and wherein:
   the first graph convolutional layer comprises at least one sample node representing a sample and at least one proxy node representing a set of samples, and sample nodes belonging to a given set of samples are unidirectionally connected to a given proxy node, and proxy nodes are interconnected, and each proxy node performs a weighted sum on sample features of sample nodes connected to the each proxy node to obtain a proxy feature of the each proxy node, and proxy features of all proxy nodes are fused through the first graph convolutional layer to obtain output features of the proxy nodes of the first graph convolutional layer; and
   the second graph convolutional layer comprises at least one sample node representing a sample and at least one proxy node representing a set of samples, and sample nodes belonging to a given set of samples are bidirectionally connected to a given proxy node, and proxy nodes are interconnected, and the output features of the proxy nodes of the first graph convolutional layer are fused through the second graph convolutional layer to obtain an output feature of each sample node.

3. The method according to claim 2, wherein the graph convolutional neural network comprises the first graph convolutional layer and at least one second graph convolutional layer, wherein an output of the first graph convolutional layer is used as an input of the second graph convolutional layer, and an output feature of each second graph convolutional layer is used as an input of a next second graph convolutional layer or an input of a classification layer of the initialization model.

4. The method according to claim 1, wherein the method uses at least one set of labeled samples, and each of the at least one set of labeled samples is from one data source.

5. The method according to claim 1, further comprising:
   acquiring a to-be-recognized monitoring image; and
   inputting the monitoring image into the target re-recognition model to generate a target re-recognition result.

6. An electronic device, comprising:
   at least one processor; and
   a memory storing instructions executable by the at least one processor, the instructions, when executed by the at least one processor, cause the at least one processor to perform operations comprising:
   acquiring a set of labeled samples, a set of unlabeled samples and an initialization model obtained through supervised training;
   performing feature extraction on each sample in the set of the unlabeled samples by using the initialization model;
   clustering features extracted from the set of the unlabeled samples by using a clustering algorithm;
   assigning, for each sample in the set of the unlabeled samples, a pseudo label to the each sample according to a cluster corresponding to the each sample in a feature space; and
   mixing a set of samples with a pseudo label and the set of the labeled samples as a set of training samples, and performing the supervised training on the initialization model to obtain a target re-recognition model, wherein mixing the set of samples with the pseudo label and the set of the labeled samples as the set of training samples, and performing the supervised training on the initialization model to obtain the target re-recognition model, comprises:
   performing feature extraction on each sample in the set of the labeled samples by using the initialization model;
   fusing, by using a graph convolutional neural network, a feature of each sample in the set of the samples with the pseudo label and a feature of each sample in the set of the labeled samples to obtain a fused feature of each sample; and
   training the initialization model based on the fused feature of each sample in the set of the samples with the pseudo label and the fused feature of each sample in the set of the labeled samples to obtain the target re-recognition model.

7. The electronic device according to claim 6, wherein the graph convolutional neural network comprises a first graph convolutional layer and a second graph convolutional layer, and wherein:
   the first graph convolutional layer comprises at least one sample node representing a sample and at least one proxy node representing a set of samples, and sample nodes belonging to a given set of samples are unidirectionally connected to a given proxy node, and proxy nodes are interconnected, and each proxy node performs a weighted sum on sample features of sample nodes connected to the each proxy node to obtain a proxy feature of the each proxy node, and proxy features of all proxy nodes are fused through the first graph convolutional layer to obtain output features of the proxy nodes of the first graph convolutional layer; and the second graph convolutional layer comprises at least one sample node representing a sample and at least one proxy node representing a set of samples, and sample nodes belonging to a given set of samples are bidirectionally connected to a given proxy node, and proxy nodes are interconnected, and the output features of the proxy nodes of the first graph convolutional layer are fused through the second graph convolutional layer to obtain an output feature of each sample node.

8. The electronic device according to claim 7, wherein the graph convolutional neural network comprises the first graph convolutional layer and at least one second graph convolutional layer, wherein an output of the first graph convolutional layer is used as an input of the second graph convolutional layer, and an output feature of each second graph convolutional layer is used as an input of a next second graph convolutional layer or an input of a classification layer of the initialization model.

9. The electronic device according to claim 6, wherein the operations use at least one set of labeled samples, and each of the at least one set of labeled samples is from one data source.

10. The electronic device according to claim 6, wherein the operations further comprise:
  acquiring a to-be-recognized monitoring image; and
  inputting the monitoring image into the target re-recognition model to generate a target re-recognition result.

11. A non-transitory computer readable storage medium storing computer instructions, wherein the computer instructions, when executed by a computer, cause the computer to perform operations comprising:
  acquiring a set of labeled samples, a set of unlabeled samples and an initialization model obtained through supervised training;
  performing feature extraction on each sample in the set of the unlabeled samples by using the initialization model;
  clustering features extracted from the set of the unlabeled samples by using a clustering algorithm;
  assigning, for each sample in the set of the unlabeled samples, a pseudo label to the each sample according to a cluster corresponding to the each sample in a feature space; and
  mixing a set of samples with a pseudo label and the set of the labeled samples as a set of training samples, and performing the supervised training on the initialization model to obtain a target re-recognition model, wherein mixing the set of samples with the pseudo label and the set of the labeled samples as the set of training samples, and performing the supervised training on the initialization model to obtain the target re-recognition model, comprises:
  performing feature extraction on each sample in the set of the labeled samples by using the initialization model;
  fusing, by using a graph convolutional neural network, a feature of each sample in the set of the samples with the pseudo label and a feature of each sample in the set of the labeled samples to obtain a fused feature of each sample; and
  training the initialization model based on the fused feature of each sample in the set of the samples with the pseudo label and the fused feature of each sample in the set of the labeled samples to obtain the target re-recognition model.

12. The storage medium according to claim 11, wherein the graph convolutional neural network comprises a first graph convolutional layer and a second graph convolutional layer, and wherein:
  the first graph convolutional layer comprises at least one sample node representing a sample and at least one proxy node representing a set of samples, and sample nodes belonging to a given set of samples are unidirectionally connected to a given proxy node, and proxy nodes are interconnected, and each proxy node performs a weighted sum on sample features of sample nodes connected to the each proxy node to obtain a proxy feature of the each proxy node, and proxy features of all proxy nodes are fused through the first graph convolutional layer to obtain output features of the proxy nodes of the first graph convolutional layer; and the second graph convolutional layer comprises at least one sample node representing a sample and at least one proxy node representing a set of samples, and sample nodes belonging to a given set of samples are bidirectionally connected to a given proxy node, and proxy nodes are interconnected, and the output features of the proxy nodes of the first graph convolutional layer are fused through the second graph convolutional layer to obtain an output feature of each sample node.

13. The storage medium according to claim 12, wherein the graph convolutional neural network comprises the first graph convolutional layer and at least one second graph convolutional layer, wherein an output of the first graph convolutional layer is used as an input of the second graph convolutional layer, and an output feature of each second graph convolutional layer is used as an input of a next second graph convolutional layer or an input of a classification layer of the initialization model.

14. The storage medium according to claim 11, wherein the operations use at least one set of labeled samples, and each of the at least one set of labeled samples is from one data source.

15. The storage medium according to claim 11, wherein the operations further comprise:
  acquiring a to-be-recognized monitoring image; and
  inputting the monitoring image into the target re-recognition model to generate a target re-recognition result.

* * * * *